E. E. MORTIMER.
TRAP.
APPLICATION FILED SEPT. 15, 1920.
1,418,603.
Patented June 6, 1922.
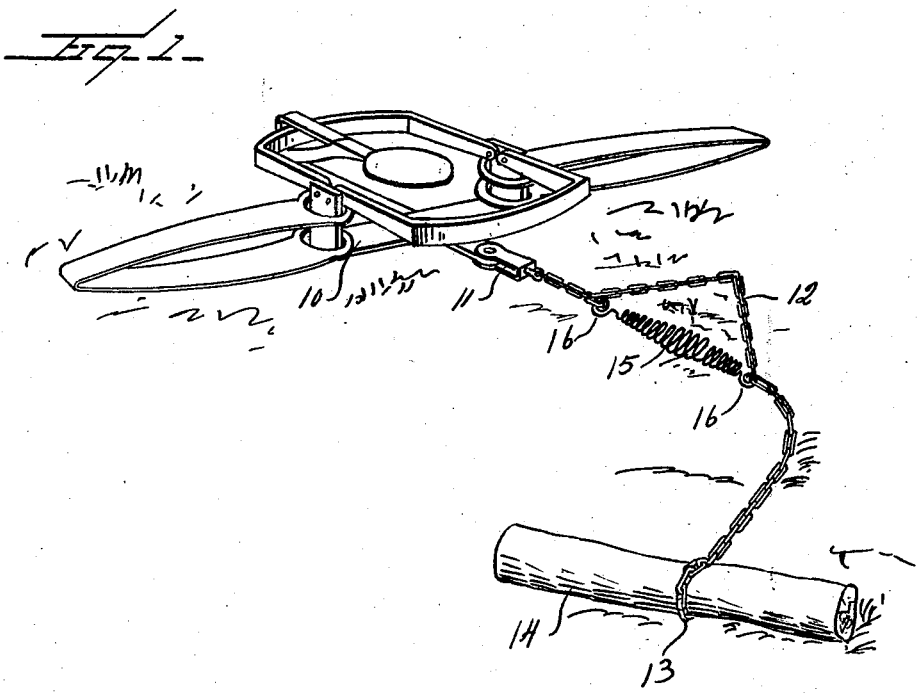
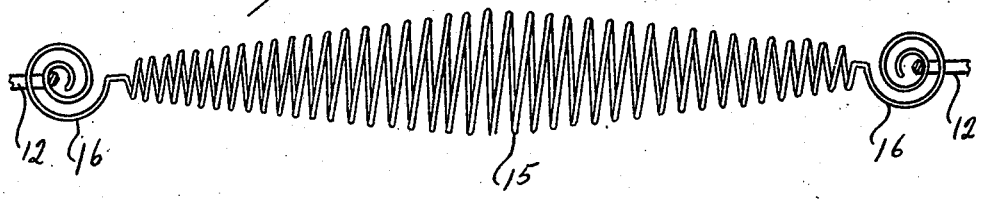
Inventor
E. E. Mortimer
By Watson E. Coleman
Attorney

UNITED STATES PATENT OFFICE.

EMMET EDWARD MORTIMER, OF WOODCHOPPER CREEK, TERRITORY OF ALASKA.

TRAP.

1,418,603.          Specification of Letters Patent.     Patented June 6, 1922.

Application filed September 15, 1920. Serial No. 410,532.

*To all whom it may concern:*

Be it known that I, EMMET EDWARD MORTIMER, a citizen of the United States, residing at Woodchopper Creek, Territory of Alaska, have invented certain new and useful Improvements in Traps, of which the following is a specification, reference being had to the accompanying drawings.

This invention relates to improvements in trap construction and more particularly to the construction of that type of trap generally designated as a steel trap.

An important object of the invention is to provide a device for attachment to the chain of the present type of steel trap which is used for tethering the trap to a drag stationary stake or the like and whereby the chain is provided, intermediate its end, with a flexible auxiliary link preventing an animal caught in the trap from bringing its full weight to bear on the trap and when he lunges in attempting to escape therefrom. This flexible link preferably takes the form of a spiral spring of a strength suitable for the size of animals generally caught in the trap to which it is attached, the spring being provided at its ends with hook portions which are engaged in the links of the chain at points spaced apart a greater distance than the length of the spring, thereby providing in the chain a slack portion.

I am aware that devices have been provided of this general character embodying a spring adapted to check the lunge of the animal caught in the trap, but these devices have, in the main, been constructed so that they necessitate the change of construction of the steel trap proper, and may not, accordingly, be adapted for use in traps which are in the possession of the trapper. These devices, with which I am familiar are furthermore open to the objections that the spring, in event of its being weakened with use, or broken with use, do not provide a further and permanent attachment for the trap, and may not, furthermore, be readily adjusted as may my device.

In the accompanying drawings, wherein for the purpose of illustration is shown a preferred embodiment of my invention, and wherein like reference characters designate like parts throughout:

Figure 1 is a perspective view of a trap, trap chain and drag, the chain being provided with my improved spring attachment.

Figure 2 is a side elevation of my attachment removed.

Referring now more particularly to the drawings, the numeral 10 indicates a steel trap having secured thereto in the usual manner as at 11 the drag chain 12 consisting of a plurality of links of the usual construction, the chain 12 being provided at its free end with any suitable means 13 whereby it may be secured about the drag 14.

A steel spiral spring 15 is provided having at each end thereof a coiled attaching loop 16, preferably taking the form of a spiral bend having at least two turns therein in order that when the spiral is entered in the links of the chain it may not be readily detachable therefrom.

In attaching my device to a trap these coiled ends 16 are placed in links of the chain spaced apart a greater distance than the length of the spring. It will be obvious that the continuity of the trap chain from its point of connection to the drag is not interrupted and that, accordingly, in event of breakage of the spring or in event of its weakening through repeated lunges of the animal caught in the trap the chain 12 still retains the trap securely in position. The advantage of this will become more obvious when it is noted that traps set upon the trap line, particularly a trap line where the sets are for animals of large size such as bears, wolves and animals of similar description, the traps often lie for a period of a month or more without being shifted and during this period are often buried in snow or deep earth. The material employed in the construction of the spring is such that it rapidly deteriorates when subjected to moisture and consequently these springs may become so weakened by the time the animal enters the trap, or before the life of the trap is exhausted that they may be broken or lose their tensile strength. In such case the spring may be readily removed from the chain and a new spring substituted.

It will be obvious that the form of spring illustrated and the specific means of attaching the same to the chain may be readily altered without in any manner departing from the spirit of the invention, and I accordingly do not limit myself to such specific structure, but may make any desired change without departing from the spirit of the invention or the scope of the sub-joined claim.

Having now described my invention, what I claim is:

Anchoring means for traps comprising a chain, a helical spring having each end portion thereof coiled several times to provide helical loops, the rounds of the coils being spaced from each other to provide an entrance to the inner portion of the coil for the reception of a portion of the chain of the trap.

In testimony whereof I hereunto affix my signature.

EMMET EDWARD MORTIMER.